United States Patent [19]

Rickelton

[11] Patent Number: 5,344,567
[45] Date of Patent: Sep. 6, 1994

[54] RECOVERY OF INDIUM BY SOLVENT EXTRACTION USING TRIALKYLPHOSPHINE OXIDES

[75] Inventor: William A. Rickelton, Niagara Falls, Canada

[73] Assignee: Cyanamid Canada Inc., Ontario, Canada

[21] Appl. No.: 83,240

[22] Filed: Jun. 29, 1993

[51] Int. Cl.$^5$ .............................................. B01D 15/04
[52] U.S. Cl. ...................... 210/638; 210/634; 423/112
[58] Field of Search ...................... 210/634, 638, 639; 423/112, 10

[56] References Cited

U.S. PATENT DOCUMENTS

| | | |
|---|---|---|
| 3,462,352 | 8/1969 | Segarceanu et al. |
| 4,292,284 | 9/1981 | Tomi et al. ............... 423/112 |
| 4,372,922 | 2/1983 | Fossi et al. ............... 423/112 |
| 4,525,333 | 6/1985 | Schimmel et al. ......... 423/112 |
| 4,666,686 | 5/1987 | Krajewski et al. ........ 423/112 |
| 4,778,663 | 10/1988 | Rickelton ................. 423/10 |
| 4,806,249 | 2/1989 | Guerriero et al. ........ 210/638 |
| 4,909,939 | 3/1990 | Rickelton et al. ........ 210/634 |
| 5,028,334 | 7/1991 | Rickelton et al. ........ 210/638 |
| 5,114,549 | 5/1992 | Takigawa ................. 210/638 |

FOREIGN PATENT DOCUMENTS

| | | |
|---|---|---|
| 888708 | 11/1981 | Belgium . |
| 14420 | 2/1981 | Japan . |
| 135128 | 8/1983 | Japan . |
| 251128 | 12/1985 | Japan . |

*Primary Examiner*—Robert A. Dawson
*Assistant Examiner*—Ana M. Fortuna
*Attorney, Agent, or Firm*—Frank M. Van Riet

[57] ABSTRACT

This invention relates to a process for the recovery of indium from aqueous acid solutions. More particularly, it concerns the use of a combination of a dialkyl phosphoric acid and a mixture of trialkyl phosphine oxides to extract indium from acidic sulphate leach liquors.

12 Claims, No Drawings

RECOVERY OF INDIUM BY SOLVENT EXTRACTION USING TRIALKYLPHOSPHINE OXIDES

BACKGROUND OF THE INVENTION

Indium is a comparatively rare metal with an abundance in the earth's crust of approximately 1.0 ppm. Its major use is as an alloying element in the manufacture of heavy duty bearings, soldering compounds and electrical fuses. Electronics applications in the preparation of indium phosphide semiconductors and optical devices are gaining in importance.

The most important source of indium is as a by-product from primary zinc and zinc-lead production. Processing involves the recovery of indium by solvent extraction with di-2-ethylhexyl phosphoric acid (D2EHPA) from acidic sulphate leach liquors derived, for example, from flue dusts. However, indium, like ferric iron, is known from Corinea, et al., U.S. Pat. No. 3,462,352, to be strongly extracted by D2EHPA and excessive quantities of strong mineral acids, e.g., 8–9M HCl are needed for back-extraction or stripping. Handling such volumes of acid on an industrial scale poses difficult problems in terms of safety, waste disposal and corrosion.

In Rickelton, U.S. Pat. No. 4,778,663, is disclosed a process for the recovery of uranium from wet process phosphoric acid. It is reported therein that the use of a combination of a dialkyl phosphoric acid and a mixture of at least four trialkyl phosphine oxides substantially enhances the extraction of uranium from wet process phosphoric acid because of phase modification by the phosphine oxides, i.e., the uranium forms a water insoluble complex with the phosphine oxide.

In Rickleton and Boyle, U.S. Pat. No. 5,028,334, a process is disclosed to selectively recover tin from aqueous acid solutions using extractant compositions comprising branched phosphine oxide compounds, alone, or in combination with mixtures of at least four phosphine oxides which appear to form water insoluble complexes with tin.

In neither citation, however, is there any hint or suggestion that modifying the D2EHPA with the specific phosphine oxides will lead to essentially quantitative indium stripping with weaker acids, thus reducing waste disposal and corrosion problems.

Thus, a need still exists for a more efficient process to recover the relatively small amounts of valuable indium from the acidic sulphate leach liquors.

It has now been unexpectedly discovered that enhanced stripping of indium can be obtained with a solvent extractant combination of (i) a dialkyl phosphoric acid, e.g. DEHPA, and (ii) 1) a mixture of at least four phosphine oxides containing unsymmetrical tertiary phosphine oxides, 2) a mixture of branched tertiary phosphine oxides, or 3) a combination of 1) and 2). The phosphine oxide mixture 1) containing at least four components is prepared by the reaction of phosphine and a mixture of two olefins followed by oxidation of the resulting trialkyl phosphine mixture to the corresponding tertiary phosphine oxides. The amount of each component is carefully controlled by the ratio of the two olefins reacted with phosphine in the range of 10:90 to about 90:10 and preferably, in the range of 60:40 to 40:60. The phosphine oxide mixture 2) containing the branched compounds is prepared also by the reaction of phosphine and a mixture of two olefins, but in this instance, sequentially, one of the olefins is branched, and the other unbranched. The instant process is advantageous in that it provides substantially higher indium stripping efficiency than the conventional DEHPA extraction solvent mixture, thus reducing the number of stripping stages and permitting the use of relatively weak acids, e.g., $2M.H_2SO_4$. An added advantage is that the presence of the phosphine oxides prevents the accumulation of a difficult-to-strip ferric iron complex from iron in the leach liquors into the solvent. This complex, see, Rickelton, France Demande, FR 2,481,941, corresponding to Belgium Patent 888,708, Nov. 9, 1981, is believed to be an $Fe^{+++}$-D2EHPA polymer having a molecular weight of approximately 100,000. Its presence can result in high viscosities, consequently poor phase disengagement rates and, eventually, solvent poisoning.

The tertiary phosphine oxide mixture used in the process of this invention is disclosed in U.S. Pat. No. 4,909,939, granted Mar. 20, 1990. This mixture is reported to extract acetic acid and phenol from aqueous solutions. The branched tertiary phosphine oxides used in the process of this invention are disclosed on U.S. Pat. No. 5,028,334 in connection with the tin recovery process mentioned above.

SUMMARY OF THE INVENTION

Provided in accordance with the present invention are processes for the extraction of indium from aqueous acidic solutions, which processes comprise:

(a) contacting the indium-containing acid solution with a solvent extractant combination comprising
   (i) a dialkyl phosphoric acid and
   (ii) a tertiary phosphine oxide selected from 1) a mixture containing at least four different components each of the same general formula $RR^{i}R^{ii}PO$ wherein R, $R^i$, $R^{ii}$ are the same or different saturated hydrocarbon radicals of 6 to about 16 carbon atoms, and at least two components of said tertiary phosphine oxide mixture being unsymmetrical tertiary phosphine oxides containing at least one R, $R^i$, $R^{ii}$ group different from the other said groups; 2) a mixture of branched tertiary phosphine oxide compounds selected from those of the formulae:

$R^{iii}R^{iv}{}_2PO$ and $R^{iv}{}_3PO$ wherein $R^{iii}$ and $R^{iv}$ are selected from saturated hydrocarbon radicals of from about 6 to about 16 carbon atoms and wherein $R^{iii}$ is unbranched and $R^{iv}$ comprises at least two branches per hydrocarbon radical; or a combination of 1) and 2);

(b) separating the resulting dialkyl phosphoric acid-phosphine oxide-indium complex from the acid solution; and (c) recovering the indium from the complex.

Further provided by the present invention are preferred processes as defined above, wherein said tertiary phosphine oxide mixture contains four components in which R is n-octyl, $R^i$ is n-hexyl and $R^{ii}$ is either n-hexyl or n-octyl; and those wherein $R^{iii}$ is n-octyl and $R^{iv}$ is 2,4,4-trimethylpentyl.

Preferred are processes wherein said tertiary phosphine oxide mixture is prepared from the reaction of phosphine and a mixture of 1-octene and 1-hexene, or a mixture of 1-octene and 2,4,4-trimethyl-1-pentene, in the ratio 90:10 to about 10:90. Most preferred are processes wherein said tertiary phosphine oxide mixture is prepared from a mixture of 1-octene and 1-hexene, or a mixture of 2,4,4-trimethyl-1-pentene and 1-octene, in the ratio of 60:40 by weight.

DETAILED DESCRIPTION OF THE INVENTION

In accordance with this invention, under typical commercial conditions, an effective amount of the extractant is added to an acidic sulphate leach liquor derived, for example, from flue dusts recovered as a result of primary zinc and zinc-lead production. The ratio of the aqueous acid phase to the extractant organic phase may generally vary from 20:1 to about 1:20 by volume. However, a ratio in the range of 5:1 to about 1:5 will usually be found to be effective.

The extractant comprises a combination of a dialkyl phosphoric acid and the tertiary phosphine oxide mixture in the molar ratio of about 10:1 to about 1:10, preferably about 3:1 to 1:3. The said extractant combination may be used "neat" or dissolved in a diluent, typically of the hydrocarbon type.

The tertiary phosphine oxides denoted 1) for use in this invention are mixtures having at least four different components, each having the same general formula $RR^iR^{ii}PO$ in which $R$, $R^i$ and $R^{ii}$ within each component species may be the same or different saturated hydrocarbon radicals of 6 to about 16 carbon atoms, and at least two components being unsymmetrical tertiary phosphine oxides containing at least one $R$, $R^i$, $R^{ii}$ group different from the other said groups.

Suitable tertiary phosphine oxides denoted 1) for use in the instant process include, but are not limited to, mixtures containing any of the foregoing alkyl substituents. They may preferably be four component mixtures having the formulae $R_3PO$, $R^i_3PO$, $R_2R^iPO$ and $RR^i_2PO$ wherein $R$ and $R^i$ is represented by a saturated hydrocarbon radical, e.g. n-octyl and n-hexyl; however, ten component mixtures having the formulae $R_3PO$, $R^i_3PO$, $R^{ii}_3PO$, $R_2R^iPO$, $R_2R^{ii}PO$, $RR^i_2PO$, $RR^{ii}_2PO$, $R^i_2R^{ii}PO$, $R^iR^{ii}_2PO$, $RR^iR^{ii}PO$, wherein $R$, $R^i$ and $R^{ii}$ is represented by a saturated hydrocarbon radical, e.g. hexyl, octyl and decyl, are also useful.

The tertiary phosphine oxide mixtures denoted 1) and 2) may be prepared by the reaction of phosphine and a mixture of two olefins, e.g. 1-octene and 1-hexene, or 1-octene and 2,4,4-trimethylpentene, in the presence of a free-radical initiator, such as azobis(isobutyronitrile). This will give a two or four component mixture of tertiary phosphines which is then oxidized by hydrogen peroxide to give the corresponding mixture of tertiary phosphine oxides. Alternatively, phosphine may be reacted with a mixture of three olefins, e.g. hexene, octene and decene, which will give a ten-component mixture of tertiary phosphine oxides.

As will be exemplified below, it has been found that stripping is generally enhanced if the percentage of each tertiary phosphine oxide in the tertiary phosphine oxide mixture is carefully controlled by the appropriate mixture of the olefins used in the reaction with phosphine. The ratio of olefins that may be used in the preparation of the four component mixture of tertiary phosphine oxides can range from about 90:10 to about 10:90, preferably from about 60:40 to about 40:60 by weight. Examples of such mixtures denoted 1) include, but are not limited to: trihexylphosphine oxide, trioctylphosphine oxide, dihexyloctylphosphine oxide, dioctylhexylphosphine oxide prepared from a 1-hexene/1-octene olefin mixture; trihexylphosphine oxide, tridecylphosphine oxide, dihexyldecylphosphine oxide, didecylhexylphosphine oxide, prepared from a 1-hexene/1-decene olefin mixture: trioctylphosphine oxide, tridecylphosphine oxide, dioctyldecylphosphine oxide, didecyloctylphosphine oxide, prepared from a 1-octene/1-decene olefin mixture, and the like. A preferred tertiary phosphine oxide mixture is prepared from a 60:40 mixture of 1-octene:1-hexene. An extractant composition of this type is available from American Cyanamid Company under the trademark CYANEX® 923 extractant. Examples of such branched mixtures denoted 2) include, but are not limited to: octyl-di-2,4,4-trimethylpentylphosphine oxide and tri-2,4,4-trimethylpentylphosphine oxide. An extractant composition of this type is available from American Cyanamid Company under the trademark CYANEX® 925 extractant.

Suitable dialkyl phosphoric acids for use in combination with the tertiary phosphine oxide mixture in the instant process have from about 6 to about 16 carbon atoms per alkyl group. Representative dialkyl phosphoric acids for use in the instant process include, but are not limited to, di(2-ethylbutyl)phosphoric acid, di(2-ethylhexyl)phosphoric acid, di(2-ethyldecyl)phosphoric acid, di(2-ethyldodecyl)phosphoric acid, bis(2,4,4-trimethylpentyl)phosphoric acid, and the like. The preferred dialkyl phosphoric acid is di(2-ethylhexyl)-phosphoric acid (D2EHPA). The dialkyl phosphoric acids useful in this invention can be prepared by methods known to those skilled in the art or are available commercially. For example, di(2-ethylhexyl)phosphoric acid is available from Albright and Wilson under the name D2EHPA, and Daihachi Chemical Company, under the tradename DP-8R.

Suitable diluents for the tertiary phosphine oxide/dialkyl phosphoric acid extractant mixtures of this invention include water-immiscible hydrocarbons including, but not limited to, toluene, xylene, kerosene, and the like. The preferred diluents are aliphatic type hydrocarbons, such as, for example, Ashland® 140 available from Ashland Chemicals and EXXSOL® D-80 available from Exxon Co.; however, the particular diluent is not critical so long as it is compatible with the process.

In carrying out the process of this invention, the indium-bearing aqueous acid solution is contacted, either by batch or continuously counter-current, with the solvent extractant combination of the dialkylphosphoric acid and the tertiary phosphine oxide mixture. The aqueous to organic phase, e.g. A/O volume, is chosen to most effectively remove the indium. In the absence of a diluent, A/O ratios of about 5:1 to about 1:5, preferably about 3:1 to about 1:3, have been found to be effective. In the presence of a diluent, A/O ratios of about 20:1 to about 1:20, preferably about 3:1 to about 1:3, are effective. Phase contact is commonly achieved in devices known to those working in this art as "mixer-settlers," although many other types of devices, such as liquid-liquid extraction columns, are available. The dialkyl phosphoric acid-tertiary phosphine oxide extractant combination then forms a complex with the indium. The complex reports to the organic phase of the two-phase liquid mixture and the dispersion then flows to the settler where phase disengagement occurs under quiescent conditions. Generally, the extraction is carried out between about 10° to about 100° C., preferably at about 20° to about 70° C.

As will be shown hereinafter, adding the four component liquid phosphine oxide to the D2EHPA reduces extraction at high acidities (>50 g/L $H_2SO_4$) in comparison to the unmodified solvent containing only D2EHPA. Simultaneously, the data show that essentially quantitative indium extraction can be obtained with the modified solvents at <50 g/L $H_2SO_4$. It may be inferred from the data that the modified solvent will be easier to strip than the unmodified solvent. The data also will indicate that increasing the concentration of the four component liquid phosphine oxide mixture from 5 v/o to 10 v/o increases the magnitude of the effect. The data further indicate that the branched phosphine oxide phase modifier will perform the same function as the four component mixture but at a reduced concentration, 5 v/o vs 10 v/o. This latter finding is surprising since synergic interactions between branched chain acidic extractants are usually stronger when the neutral extractant is straight chained.

The indium-loaded organic phase may be treated with a stripping agent to remove the indium from the organic phase back into the aqueous phase for subsequent isolation of the indium. As has been noted, the presence of phosphine oxides allows stripping to be accomplished efficiently with relatively weak mineral acids, e.g., 2M $H_2SO_4$. If, for example, 200 g/L $H_2SO_4$ is used as the strip feed, 2 g/L of indium is readily stripped from the solvent modified with 5 v/o of the branched phosphine oxide in three theoretical stages at O/A=2 to produce a strip liquor containing 4 g/L In. The unmodified solvent, containing 5 v/o D2EHPA, can only be stripped at lower O/A ratios (higher A/O ratios). For example, one theoretical stage at O/A=0.5 will reduce indium in the solvent from 2 g/L to 0.5 g/L. This translates into using four times the amount of acid, producing a more dilute strip liquor containing only 0.38 g/L In and leaving 0.5 g/L of unstripped indium on the solvent which will adversely effect extraction performance on solvent recycle. The results hereinafter will show also that ferric iron can be completely and efficiently stripped from solvents modified with the phosphine oxides used in this invention. This is in contrast the inability to strip substantial concentrations of iron with the unmodified solvent or with solvent modified with other phosphorus compounds, like tributylphosphate (TBP). Eventually, this leads to solvent poisoning via the accumulation of unstripped ferric iron.

DESCRIPTION OF THE PREFERRED EMBODIMENTS

The following examples illustrate the processes of the present invention. They are not to be construed to limit the invention in any manner whatsoever. All parts and percentages are by weight unless otherwise specified.

Procedure A

Phosphine is reacted in an autoclave with an olefin mixture composed of 60% by weight 1-octene and 40% by weight 1-hexene using azobis(isobutyronitrile) as the free-radical initiator at 80° C. for a total of five hours. The excess phosphine is vented, and the resulting mixture is analyzed by gas chromatography and then oxidized with 25% hydrogen peroxide solution at 50°-60° C. for 2 hours. The tertiary phosphine oxide is isolated as a liquid (freezing point, less than 10° C.) by vacuum stripping of water and unreacted olefins. It contains 15.6% tri-n-octylphosphine oxide, 8.2% tri-n-hexylphosphine oxide, 38.1% di-n-octyl-n-hexylphosphine oxide and 30.9% n-octyl-di-n-hexylphosphine oxide.

Procedure B

Phosphine is reacted in an autoclave with an olefin mixture composed of 50% 1-octene and 50% 1-hexene by weight according to Procedure A. The tertiary phosphine mixture obtained is oxidized with hydrogen peroxide to give a liquid mixture of the corresponding tertiary phosphine oxides. The distribution of the four components in the tertiary phosphine oxide mixture is as follows: 20.3% tri-n-octylphosphine oxide, 7.1% tri-n-hexylphosphine oxide, 42.1% di-n-octyl-hexylphosphine oxide and 31.5% di-n-hexyl-n-octyl-phosphine oxide.

Procedure C

In a one-gallon autoclave, 500 parts of diisobutylene is reacted with 500 psig phosphine to which mixture is added 1,200 parts of a solution containing 30 parts of azo-bis(isobutyronitrile) (AIBN) in diisobutylene at 85° C. for 10 hrs. The reaction mixture is subjected to vacuum stripping to remove unreacted diisobutylene and mono 2,4,4-trimethylpentylphosphine. The residue is then reacted with 50% molar excess 1-octene in the presence of 1 mole AIBN free radical initiator at 80° C. for 6 hrs. Unreacted n-octene is removed by vacuum distillation and the residue containing a mixture of mostly 80–85% bis (2,4,4-trimethylpentyl)-n-octylphosphine and 12–15% tris(2,4,4-trimethylpentyl)phosphine is converted to the corresponding mixture of symmetrical branched and unsymmetrical branched tertiary phosphine oxides by reacting with 25% hydrogen peroxide at 50°–60° C.

EXAMPLES 1 AND 2

Equal volume samples of aqueous sulfuric acid of various strengths containing 1.0 part per liter indium (In+++) as its sulfate salt are contacted with a solvent extractant (organic phase) containing 5 v/o of di(2-ethylhexyl)phosphoric acid (D2EHPA) and 5 v/o of a liquid phosphine oxide mixture like that of Procedure A. The solvent phase contains, as an aliphatic diluent, EXXSOL ® D-80 (a product of Exxon Co.). The aqueous and organic phases are shaken for 5 minutes at 24° C. to complete equilibration. The aqueous phase (raffinate) is separated from the organic phase and analyzed for indium. The concentration of indium in the organic phase is calculated by mass balance. The procedure is repeated with the identical solvent extractant mixture except for substitution of 10 v/o of the liquid phosphine oxide mixture for the 5 v/o. A control solvent extractant mixture of 5 v/o of D2EHPA in EXXSOL ® D-80 is also contacted with the above indium-bearing aqueous sulfuric acid solutions for 5 minutes at 24° C., at an aqueous to organic ratio of one (by volume). The indium concentration is determined as above in the aqueous raffinate and organic phase. The test results are set forth in Table I below.

TABLE I

Effect of Mixed Tertiary Phosphine Oxides on Indium Recovery with D2EHPA

| Example | | % Indium Extraction | Equilibrium $H_2SO_4$ Conc.(parts/L) |
|---|---|---|---|
| 1A* | 5 v/o D2EHPA | 81.9 | 188 |
| | | 88.6 | 143 |
| | | 97.1 | 102 |
| | | 98.9 | 70.9 |

TABLE I-continued

Effect of Mixed Tertiary Phosphine Oxides on Indium Recovery with D2EHPA

| Example | | % Indium Extraction | Equilibrium H$_2$SO$_4$ Conc.(parts/L) |
|---|---|---|---|
| | | 99.8 | 44.9 |
| | | 100 | 28.0 |
| | | 100 | 18.7 |
| 1 | 5 v/o D2EHPA | 15.0 | 184 |
| | 5 v/o mixed | 27.5 | 136 |
| | phosphine | 47.5 | 95.1 |
| | oxides | 64.0 | 66.1 |
| | (Proc.A) | 91.2 | 42.8 |
| | | 96.1 | 24.4 |
| | | 98.5 | 16.2 |
| 2 | 5 v/o D2EHPA | 2.5 | 181 |
| | 10 v/o mixed | 8.7 | 134 |
| | phosphine | 22.5 | 95.9 |
| | oxides | 40.0 | 64.7 |
| | (Proc.A) | 59.0 | 44.1 |
| | | 82.5 | 26.6 |
| | | 93.5 | 17.5 |

*Control

The data in the Table illustrate that adding the mixed trialkylphosphine oxides to the solvent reduces extraction at high acidities (Examples 1 and 2) in comparison to the unmodified solvent containing only D2EHPA (Control Example 1A*), thus leading to the inference that the modified solvent will be easier to strip than the unmodified solvent. The data moreover indicate that increasing the concentration of the mixed trialkylphosphine oxides increases the magnitude of the effect.

EXAMPLE 3

The procedure of Examples 1 and 2 is repeated substituting the mixed branched tertiary phosphine oxides typified by Procedure C. The results are set forth in Table II:

TABLE II

Effect of Mixed Branched Tertiary Phosphine Oxides on Indium Recovery with D2EHPA

| Example | | % Indium Extraction | Equilibrium H$_2$SO$_4$ Conc. (parts/L) |
|---|---|---|---|
| 3 | 5 v/o D2EHPA | 0 | 157 |
| | 5 v/o mixed | 7.5 | 113 |
| | branched | 24.0 | 79.9 |
| | phosphine | 45.0 | 55.7 |
| | oxides | 73.5 | 36.7 |
| | (Proc.C) | 89.5 | 21.9 |
| | | 95.0 | 14.1 |

The results are substantially similar to those of Example 2.

Stripping data are next obtained using 200 parts/L of H$_2$SO$_4$ as the strip feed. The control solvent comprises 5 v/o D2EHPA in EXXSOL ® D-80 loaded to 1.98 parts/L In$^{+++}$. The solvent of the invention comprises 5 v/o D2EHPA. 5 v/o of mixed branched tertiary phosphine oxides (Procedure C), 1.62 parts/L of In$^{+++}$ and EXXSOL ® D-80. Phase contact is for 5 mins. at 24°. The results are set forth in Table III:

TABLE III

Effect of Mixed Branched Tertiary Alkyl Phosphine Oxides on Indium Stripping
Equilibrium Indium Concentration (g/L)

| | 5 v/o D2HEPA* | | 5 v/o D2EHPA + 5 v/o Mixed R$_3$PO | |
|---|---|---|---|---|
| A/O | Organic | Aqueous | Organic | Aqueous |
| 0.2 | — | — | 0.94 | 3.90 |
| 0.5 | 1.23 | 1.49 | 0.42 | 2.60 |
| 1 | 1.03 | 0.95 | 0.24 | 1.48 |
| 2 | 0.76 | 0.61 | 0.18 | 0.77 |
| 5 | 0.54 | 0.29 | 0.09 | 0.33 |

*Control

The results indicate that indium is readily stripped from the solvent modified with the mixed branched tertiary phosphine oxides. In contrast, the control sample would require using four times the amount of acid, producing a more dilute strip liquor. This will adversely effect extraction performance on solvent recycle.

The advantageous effect of the tertiary phosphine oxide phase modifiers is further demonstrated by contacting the extractants with aqueous solutions containing ferric sulphate. 100 parts/L H$_2$SO$_4$ are used as the strip feed. The three solvents are as follows:

1) 5 v/o D2EHPA in EXXSOL ® D-80 diluent loaded to 3.45 parts/L In$^{+++}$.
2) 5 v/o D2EHPA, 5 v/o mixed branched phosphine oxides (Procedure C) in EXXSOL ® D-80 diluent loaded to 2.37 parts/L In$^{+++}$.
3) 5 v/o D2EHPA, 5 v/o Tributyl Phosphate (TBP) in EXXSOL ® D-80 diluent loaded to 2.10 parts/L In$^{+++}$. Phase contact is for 5 mins. at 24° C.

The conditions used and the results obtained are set forth in Table IV:

TABLE IV

Effect of Phase Modifiers on Ferric Iron Stripping
Equilibrium Fe$^{+++}$ Concentration (parts/L)

| | D2EHPA | | D2EHPA + Mixed R$_3$PO | | D2EHPA + TBP | |
|---|---|---|---|---|---|---|
| A/O | Organic | Aqueous | Organic | Aqueous | Organic | Aqueous |
| 0.2 | — | — | 1.50 | 4.35 | — | — |
| 0.5 | 1.67 | 3.55 | 0.84 | 3.00 | — | — |
| 1 | 1.37 | 2.08 | 0.61 | 1.76 | 1.02 | 1.08 |
| 2 | 1.17 | 1.14 | 0 | 1.18 | 0.94 | 0.58 |
| 5 | 0.99 | 0.49 | — | — | 0.89 | 0.24 |
| 10 | 0.99 | 0.25 | — | — | 0.77 | 0.13 |
| 15 | 0.97 | 0.15 | — | — | 0.74 | 0.09 |

The results indicate that ferric iron can be completely and efficiently stripped from solvents modified with the mixed tertiary phosphine oxides. However, substantial (0.7 to 1 part/L) concentrations of iron are not stripped from the unmodified solvent and the solvent modified with tributylphosphate (TBP). Eventually, this leads to solvent poisoning via the accumulation of unstripped ferric iron.

The above patents and publications are incorporated herein by reference.

Many variations will suggest themselves to those skilled in the art in light of the above detailed description. For example, instead of a four-component mixture of tertiary phosphine oxides, prepared from a two-olefin mix, e.g. hexene, octene, ten-component tertiary phosphine oxide mixtures can be used. The latter are prepared by the reaction of phosphine and a mixture of three olefins, e.g. 1-hexene, 1-octene, 1-decene, followed by oxidation of the resulting ten-component tertiary phosphine mixture to the corresponding tertiary phosphine oxides. Instead of using the mixed phosphine oxides of Procedure A, those of Procedure B can be used. In addition, the solvent extractant combination of dialkyl phosphoric acid-tertiary phosphine oxide mixture may include both the mixed unsymmetrical phosphine oxides of Procedure A and the mixed branched phosphine oxides of Procedure C. All such obvious variations are within the full intended scope of the appended claims.

I claim:

1. A process for the extraction of indium from aqueous acidic liquors, which process comprises:
   (a) contacting said indium-containing acid solution with a solvent extractant combination comprising
      (i) a dialkyl phosphoric acid and
      (ii) a tertiary phosphine oxide selected from 1) a mixture containing at least four different components each of the same general formula $RR^iR^{ii}PO$ wherein R, $R^i$, $R^{ii}$ are the same or different saturated hydrocarbon radicals of 6 to about 16 carbon atoms, and at least two components of said tertiary phosphine oxide mixture being unsymmetrical tertiary phosphine oxides containing at least one R, $R^i$, $R^{ii}$ group different from the other said groups; 2) a mixture of branched tertiary phosphine oxide compounds selected from those of the formulae:

$R^{iii}R^{iv}{}_2PO$ and $R^{iv}{}_3PO$ wherein $R^{iii}$ and $R^{iv}$ are selected from saturated hydrocarbon radicals of from about 6 to about 16 carbon atoms and wherein $R^{iii}$ is unbranched and $R^{iv}$ comprises at least two branches per hydrocarbon radical; or a combination of 1) and 2);

(b) separating a resulting dialkyl phosphoric acid-phosphine oxide-indium complex from said acid solution; and
   (c) recovering the indium from said complex.

2. A process as defined in claim 1 wherein said tertiary phosphine oxide mixture contains four components $R_3PO$, $R^i{}_3PO$, $R_2R^iPO$ and $RR^{ii}{}_2PO$ in which R is hexyl and $R^i$ is octyl.

3. A process as defined in claim 2 wherein said tertiary phosphine oxide mixture is prepared by the reaction of phosphine and about 90:10 to about 10:90 mixture of 1-hexene and 1-octene, followed by oxidation.

4. A process as defined in claim 3 wherein said tertiary phosphine oxide mixture is derived from about 60:40 to about 40:60 mixture of 1-hexene and 1-octene.

5. A process as defined in claim 4 wherein said tertiary phosphine oxide mixture is derived from a 60:40 mixture of 1-octene and 1-hexene.

6. A process as defined in claim 1 wherein said tertiary phosphine oxide mixture contains two components $R^{iii}{}_3PO$, and $RR^{iii}{}_2PO$ in which $R^{iii}$ is 2,4,4-trimethylpentyl and R is octyl.

7. A process as defined in claim 6 wherein said tertiary phosphine oxide mixture is prepared by the reaction of phosphine and about 90:10 to about 10:90 mixture of 2,4,4-trimethyl-1-pentene and 1-octene, followed by oxidation.

8. A process as defined in claim 3 wherein said tertiary phosphine oxide mixture is derived from about 60:40 to about 40:60 mixture of 2,2,4-trimethyl-1-pentene and 1-octene.

9. A process as defined in claim 8 wherein said tertiary phosphine oxide mixture is derived from a 60:40 mixture of 2,4,4-trimethyl-1-pentene and 1-octene.

10. A process as defined in claim 1 wherein said dialkylphosphoric acid is di(2-ethylhexyl)phosphoric acid.

11. A process as defined in claim 1 wherein said solvent extractant combination is dissolved in a water-immiscible hydrocarbon diluent.

12. A process as defined in claim 11 wherein said hydrocarbon diluent is an aliphatic hydrocarbon diluent.

* * * * *